Figure 1:
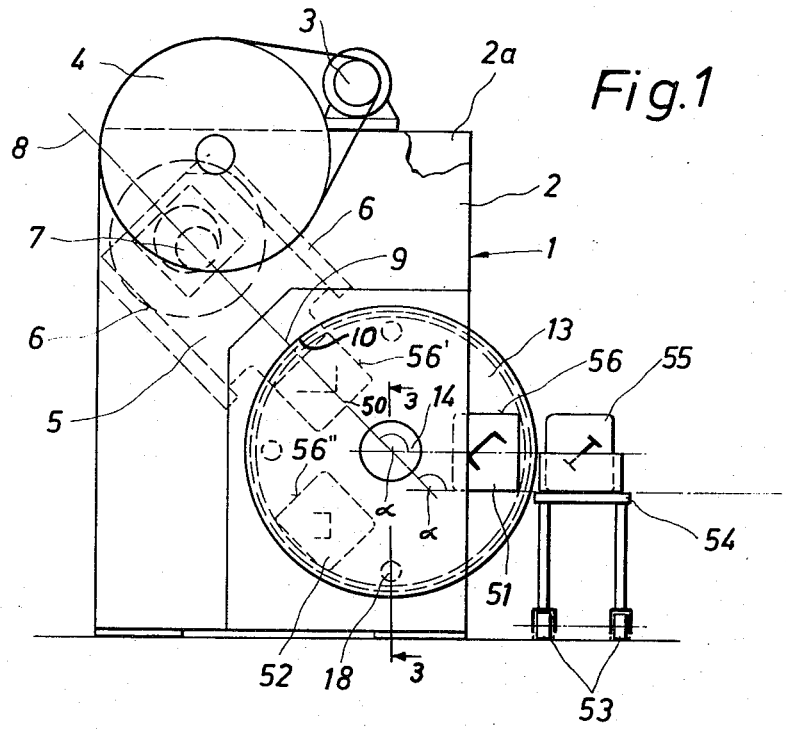

United States Patent [19]
Kruse

[11] 3,854,358
[45] *Dec. 17, 1974

[54] PROFILE STEEL CUTTER

[75] Inventor: Erwin Kruse, Gevelsberg, Germany

[73] Assignee: Werner Peddinghaus,
Sprockhovel-Hasslinghausen,
Germany

[ * ] Notice: The portion of the term of this patent subsequent to Aug. 7, 1990, has been disclaimed.

[22] Filed: Oct. 5, 1972

[21] Appl. No.: 295,121

[30] Foreign Application Priority Data
Oct. 6, 1971   Germany.............................. 2149845

[52] U.S. Cl......................... 83/198, 83/552, 83/563, 83/698
[51] Int. Cl............................................. B23d 23/00
[58] Field of Search ............................ 83/198–200, 83/698, 701, 552, 560, 563

[56] References Cited
UNITED STATES PATENTS

| | | | |
|---|---|---|---|
| 2,644,520 | 7/1953 | Nelson................................. | 83/198 |
| 3,391,591 | 7/1968 | Funke................................. | 83/198 X |
| 3,452,632 | 7/1969 | Brolund............................. | 83/698 X |
| 3,548,480 | 6/1968 | Daniels............................. | 83/563 X |

*Primary Examiner*—J. M. Meister
*Attorney, Agent, or Firm*—Walter Becker

[57] ABSTRACT

A profile steel cutter with a rectilinearly movable cutting tool carriage and with a plurality of stationary and a plurality of movable cutting blades forming sets of cutting blades with each other and circularly arranged in recesses on a turret index disc, in which the tool carriage is located at the level of the movable cutting blades on the arrestable turret index disc, while at the level of the axis of rotation of the turret index disc there is provided a magazine table which is horizontally displaceable in a direction transverse to the plane of the turret index disc, the magazine table being adapted to support sets of cutting blades arranged one behind the other when looking in the direction of movement of the magazine table which can be transferred from the table into the recesses in the turret index disc and vice versa.

3 Claims, 3 Drawing Figures

3,854,358

PROFILE STEEL CUTTER

My copending application Ser. No. 253,980 filed May 17, 1972 now U.S. Pat. No. 3,750,509-Kruse, issued Aug. 7, 1973 relates to a profile steel cutter with a rectilinearly movable cutter carriage and with a plurality of stationary cutting blade plates and a plurality of movable cutting blade plates forming a set with the stationary cutting blade plates, the cutting blade plates being circularly arranged on a vertical turret index disc while the tool carriage is located at the level of the movable cutting blade plates of the turret index disc which latter is arrestable and the disclosure therein is incorporated into this application.

A profile steel cutter of this type not only permits the exchange of the movable and stationary cutting blade plates in a minimum of time but also allows the exchange to be effected without great efforts. The structural elements employed in this connection are rather simple.

It is an object of the present invention to improve the profile steel cutter of my copending application Ser. No. 253,980 filed May 17, 1972, now U.S. Pat. No. 3,750,509-Kruse, issued Aug. 7, 1973, so that the exchange of the cutting blade plates will be further facilitated and accelerated.

This object and other objects and advantages of the invention will appear more clearly from the following specification in connection with the accompanying drawing in which:

FIG. 1 diagrammatically illustrates a profile steel cutter according to the invention equipped with a cutter carriage guided by an inclined or slanted track.

Figure 2:
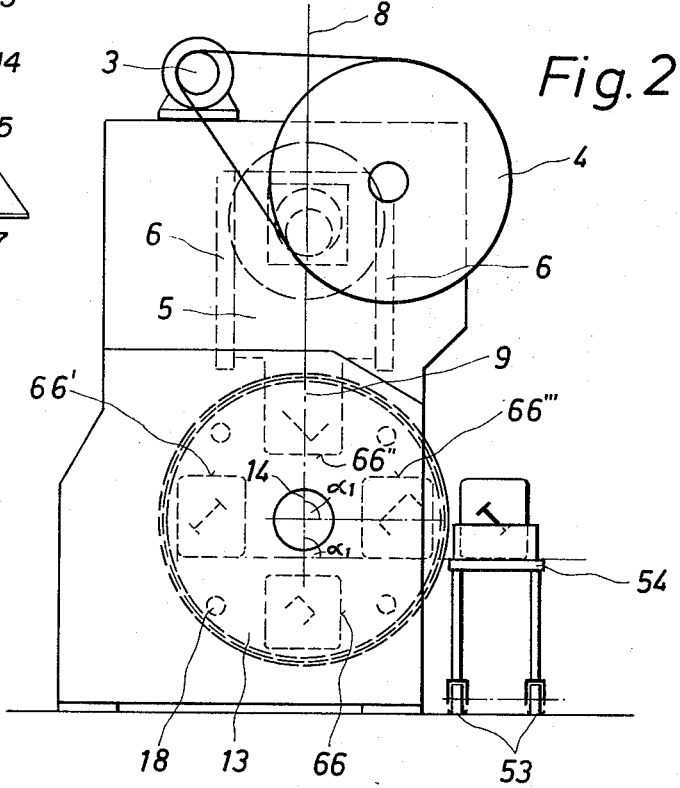

FIG. 2 diagrammatically illustrates a profile steel cutter with vertically guided cutter carriage.

Figure 3:
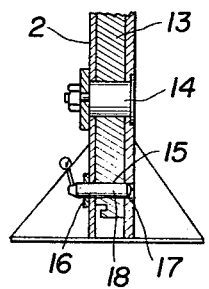

FIG. 3 is a side elevation partially in section on line 3—3 of FIG. 2.

The profile steel cutter according to the present invention is characterized primarily in that at the level of the axis of rotation of the turret index disc there is provided a magazine table which is horizontally displaceable transverse to the plane of the turret index disc and which is arranged adjacent to the turrent index disc and is equipped with sets of cutting blades arranged one behind the other, the turret index disc having recesses for receiving sets of cutting blade plates which recesses define with each other an angle which corresponds to the angle between the longitudinal axis of the carriage and the supporting surface for the cutting blade plates to be exchanged on the magazine table.

For the sake of completeness it may be mentioned that profile steel cutters are known in which a magazine table is displaceable on a track laterally of and adjacent to the cutter, the magazine table being adapted to receive sets of cutting blade plates which are arranged one behind the other. The operation of such profile steel shears or cutters provides that the exchange of a set of cutting blades is effected in such a way that the set which is the first in the shears or cutter is pulled to a free space of the magazine table after the latter has been moved into the respective longitudinal position necessary therefor. Thereupon a further displacement of the magazine table is necessary until the new cutting blade plate has reached the level of the place of insertion of the cutting blade set into the cutter. Only thereafter will it be possible to move the new cutting blade plate or set into the shears or cutter. This means that with each exchange of a cutting blade plate, the old plate or set has to be pulled onto the magazine table whereupon the magazine table is displaced and only then the new cutting blade plate or set can be inserted into the shears or cutter. During these working steps no cutting proper can be carried out. The exchange of the cutting blade plates each time requires a new setting and thereby represents a loss in time.

The cutter or shears according to the invention clearly distinguishes from the just described known arrangement inasmuch as with the design of the present invention the exchange of the cutting blades can be carried out substantially during the cutting operation so that a considerable saving in time will be obtained. While cutting with one set of cutting blade plates, the changeover of a new set of cutting blade plates from the magazine table into the corresponding recess of the turret index disc can be effected so that, after the respective cut has been completed, it is merely necessary to turn the turret index disc in order to permit the new cutting blade set to move into its cutting position relative to the cutter carriage.

According to a further development of the invention, the sets of cutting blade plates are arranged in frames which are displaceable from the magazine table into the turret index disc and vice versa. The frames may be adapted to be coupled to the turret index disc, preferably by means of quickly disengageable devices of any standard type, such as locking means, ratchet means, eccentrics, etc. Therefore, the cutting blades no longer have to be arranged on a movable part and, on the other hand, for connecting the stationary blades to the frame of the shears or cutter it will suffice to connect the frames of the sets of cutting blades to the turret index disc by a fast operating connection.

According to a further development of the invention, the turret index disc can as to its angular position relative to the carriage or the magazine table be arrested by a coupling bolt. Such coupling bolt may at the same time be operable to turn the cutter drive on and off so that when disengaging the coupling bolt, the cutter drive will be turned off whereas, when the coupling bolt is in its effective position in which the turret index disc is coupled to the frame of the cutter, the drive will be made effective. If desired, the coupling bolt may also in a similar manner engage and disengage the cutter coupling.

Referring now to the drawing in detail and FIG. 1 thereof in particular, the stand 1 for the shears or cutter comprises the body plates 2, 2a which in a manner known per se are spaced from each other and are kept spaced from each other. The top side of stand 1 supports the drive motor 3 for driving the flywheel 4 of the shears or cutter. Wheel 4 is adapted to adjust the cutter carriage 5 which is movable at an angle of 45° with regard to the horizontal plane and which is slidably guided in tracks 6 and by means of an eccentric 7 is adjustable in the direction of the longitudinal axis 8 of carriage 5.

The lower end of carriage 5 is provided with an extension 9 the lower rim 10 of which is concavely curved. This curved rim has a recess and a collar which are likewise concavely curved similar to the recess 11 and the collar 12 in FIG. 6 of my copending application Ser. No. 253,980. Cutting blades of the cutting blade sets 50, 51, 52 cooperate with the recess and collar in the manner described in my just mentioned copending application.

The turret index disc 13 is rotatable about the pivot 14 which forms the axis of rotation of the disc. The disc 13 is adapted to be arrested by a pin 18 which extends through the body plates 2, 2a and the turret index disc 13. The pivot 14 cooperates with the driving device or the coupling of the driving device in such a way that the drive is effective or the coupling is effective only when pin 18 occupies its pushed-in working position, whereas when pin 18 is pulled out of the borings 16, 17 of the plates 2, 2a and of one of the bores 15 arranged in a circle in the disc 13 the drive or the coupling is made ineffective. This may be brought about by any standard electric switches, mechanical levers or bowden wires.

Arranged adjacent to the shears or cutter and located on the base of the deivce is a two-rail track 53 which extends perpendicularly with regard to the plane of the turret index disc 13 and upon which a magazine table 54 is horizontally displaceable. The table 54 carries sets 55 of cutting blades each of which has a stationary cutting blade and a movable cutting blade pertaining thereto. The cutting blade plate sets 55 are arranged one behind the other when looking in the direction of movement of the magazine table. The level of the table 54 is so selected that the cutting blade sets on the table are located at the level of the respective recess 56 in the turret index disc 13 so that the sets of cutting blades can be pulled directly out of the recess 56 onto the table 54 or can be moved from the table into the recess. The recesses 56, 56', 56'' are so arranged that between the recess 56 and the recess 56' as well as between the recess 56 and the third recess 56'' there is each formed an angle of 135° which corresponds to the angle defined by the longitudinal axis 8 of the carriage with the cutting blade supporting surface of the table 54. Therefore is it possible first to insert a set 50 of cutting blade plates into the recess 56' which latter is then, by turning the turret index disc 13 in counterclockwise direction, turned by 135° and brought to the level of the carriage 5 (see FIG. 1). It is then possible here to work with the set 50 of cutting blade plates while at the same time the recess 56 is in front of the magazine table 54 so that this recess 56 can be loaded with a new set 51 of cutting blade plates. When the set 51 of cutting blade plates is to be used, the turret index disc is turned by 135° so that now the cutting blade plate set 51 can be actuated by the carriage 50 with the result that the recess 56'' will now be at the level of the table 54 and here a new set 52 of cutting blade plates can be inserted. To start this cycle anew, recess 56' is moved to the level of the magazine table 54, and the set 50 of cutting blade plates can be exchanged.

When selecting a larger turret index disc 13, it will be possible to provide an even greater number of recesses for further sets of cutting blade plates, which recesses are offset relative to each other by 135°, so that 4, 5, 6, 7 or 8 cutting blade plates may be employed one after another before the first recess has again to be brought to the level of the table 54 where the respective set of cutting blade plates is to be exchanged.

The sets 50, 51, 52 of cutting blade plates preferably form frames which are located on the magazine table 54, are inserted into the recesses 56, 56', 56'' and here are kept in position by means of a fast connection, for instance, by an eccentric, by locking means or a ratchet mechanism.

According to the embodiment illustrated in FIG. 2, again a turret index disc 13 is provided which can be arrested by means of a pin 18 and which is rotatable about a pivot 14 forming the axis of rotation. The cutter carriage 5 is, with the embodiment of FIG. 2, movable vertically in the direction of the longitudinal axis 8, and the recesses 66, 66', 66'' and 66''' are arranged relative to each other at an angle of 90°.

Adjacent to the cutter there is again provided a magazine table 54 which is displaceable on rails 53 in a horizontal direction and perpendicularly with regard to the plane of disc 13, table 54 being located at the level of the respective recess 66'''. Also with this embodiment, the arrangement of the recesses 66 – 66''' is so selected that the recesses confine therebetween an angle which corresponds to the angle between the longitudinal axis 8 of the carriage 5 and the supporting surface of table 54. When a set of cutting blade plates is present in recess 66'', it will be possible during the cutting operation to pull a used cutting blade plate set out of recess 66''' onto table 54 and thereupon, still while the cutter continues its cutting operation, to insert a new set of cutting blade plates into the recess 66'''. Also with this embodiment according to FIG. 2, the sets of cutting blade plates may comprise a movable and a stationary cutting blade which is inserted from the table 54 into the recesses 66 – 66''' where it is held by a quickly disengageable connection of any standard type. If desired, the cutting blades may also have slanted profiles.

It is, of course, to be understood that the present invention is, by no means, limited to the particular showing in the drawing but also comprises any modifications within the scope of the appended claims.

What I claim is:

1. A profile steel cutter which includes in combination: a rectilinearly movable tool carriage, a rotatably and adjustably mounted turret index disk having a plurality of sets of recesses, said sets of recesses being circularly arranged in spaced relationship to each other, a plurality of stationary cutting blade means stationary with regard to said turret index disk, a plurality of cutting blade means movable relative to said stationary cutting blade means and respectively forming with said stationary cutting blade means sets of cutting blade means which are interchangeable and are removably arranged in said sets of recesses during operation, locking means for arresting said turret index disk at each respective adjusted position with one set of blade means operative by said tool carriage and with a recess having another set of blade means opening laterally for removal of said set of blade means therein, and a magazine table displaceable horizontally in a direction of feed movement transverse to the plane of said turret index disk and arranged adjacent said turret index disk at substantially the level of the axis of rotation of said turret index disk and of said one of said recesses opening laterally, said magazine table being adapted to receive and support sets of cooperating cutting blade means, said sets being arranged one behind the other when looking in the direction of feed movement of said magazine table, said sets and recesses in said turret index disk defining an angle with each other corresponding to the angle defined by the longitudinal axis of said carriage with the cutting blade supporting surface of said magazine table.

2. A cutter in combination according to claim 1, which includes frame means for receiving and supporting said sets of cutting blade means and movable from said magazine table onto the turret index disc and vice versa.

3. A cutter in combination according to claim 2, which includes rapid connecting means associated with said turret index disc for quickly connecting and disconnecting said frame means to and from said turret index disc.

* * * * *